US008842827B2

(12) United States Patent
Hammouri et al.

(10) Patent No.: US 8,842,827 B2
(45) Date of Patent: Sep. 23, 2014

(54) MOBILE PHONE AIDED OPERATIONS SYSTEM AND METHOD

(75) Inventors: Ghaith M. Hammouri, Worcester, MA (US); Berk Sunar, Boylston, MA (US); Cetin Kaya Koc, Santa Barbara, CA (US)

(73) Assignee: Intryca, Inc., Santa Barbara, CA (US)

( * ) Notice: Subject to any disclaimer, the term of this patent is extended or adjusted under 35 U.S.C. 154(b) by 523 days.

(21) Appl. No.: 12/838,253

(22) Filed: Jul. 16, 2010

(65) Prior Publication Data

US 2012/0014521 A1 Jan. 19, 2012

(51) Int. Cl.
*H04L 29/06* (2006.01)

(52) U.S. Cl.
USPC .......................................................... 380/44

(58) Field of Classification Search
USPC .......................................................... 380/44
See application file for complete search history.

(56) References Cited

U.S. PATENT DOCUMENTS

| | | | |
|---|---|---|---|
| 7,291,507 B2 | 11/2007 | Bidermann | |
| 7,432,485 B2 | 10/2008 | Stallinga | |
| 7,554,337 B2 | 6/2009 | Tuyls | |
| 7,564,345 B2 | 7/2009 | Devadas | |
| 7,602,935 B2 | 10/2009 | Nishino | |
| 7,616,237 B2 | 11/2009 | Fridrich | |
| 7,681,103 B2 | 3/2010 | Devadas | |
| 7,702,927 B2 | 4/2010 | Devadas | |
| 8,077,869 B2 * | 12/2011 | Schantz et al. | 380/44 |
| 8,458,489 B2 * | 6/2013 | Beckmann et al. | 713/189 |
| 8,694,687 B2 * | 4/2014 | Hammouri et al. | 710/3 |
| 2001/0033683 A1 | 10/2001 | Tanaka et al. | |
| 2003/0133576 A1 * | 7/2003 | Grumiaux | 380/279 |
| 2003/0204743 A1 | 10/2003 | Devadas | |
| 2004/0120545 A1 | 6/2004 | Nishino | |
| 2006/0271792 A1 | 11/2006 | Devadas et al. | |
| 2007/0044139 A1 | 2/2007 | Tuyls | |
| 2007/0091376 A1 | 4/2007 | Calhoon et al. | |
| 2008/0229119 A1 | 9/2008 | Skoric | |
| 2008/0256600 A1 | 10/2008 | Schrijen | |
| 2009/0083833 A1 | 3/2009 | Ziola | |
| 2009/0222672 A1 | 9/2009 | Clarke | |
| 2009/0265758 A1 | 10/2009 | Tuyls | |
| 2010/0293384 A1 * | 11/2010 | Potkonjak | 713/176 |
| 2010/0322418 A1 * | 12/2010 | Potkonjak | 380/255 |
| 2011/0007893 A1 * | 1/2011 | Sunar et al. | 380/28 |
| 2011/0239002 A1 * | 9/2011 | Beckmann et al. | 713/189 |
| 2011/0255793 A1 | 10/2011 | Neumann et al. | |
| 2011/0320815 A1 * | 12/2011 | Matsunaka et al. | 713/168 |

OTHER PUBLICATIONS

Improving the quality of a Physical Unclonable Function using configurable Ring Oscillators Maiti, A. ; Schaumont, P. Field Programmable Logic and Applications, 2009. FPL 2009. International Conference on Digital Object Identifier: 10.1109/FPL.2009.5272361 Publication Year: 2009 , pp. 703-707.*

(Continued)

*Primary Examiner* — Harris Wang
(74) *Attorney, Agent, or Firm* — Kilpatrick Townsend & Stockton, LLP

(57) ABSTRACT

The present system and method uses multiple digital devices with possibly different users operating in concert, for performing authentication and other cryptographic operations. The multiple digital devices include, for example, a mobile device such as a cellular phone, as a central building block.

22 Claims, 4 Drawing Sheets

(56) References Cited

OTHER PUBLICATIONS

Tuyls, Pim, and Boris Škorić. "Secret key generation from classical physics: Physical uncloneable functions." Amlware Hardware Technology Drivers of Ambient Intelligence. Springer Netherlands, 2006. 421-447.*

Dodis, Ostrovsky, Reyzin, Smith; Fuzzy Extractors: How to Generate Strong Keys from Biometrics and Other Noisy Data; SIAM J. Comput. 38(1): 97-139 (2008).

Hammouri, Dana, Sunar; CDs Have Fingerprints Too, CHES 2009: 348-362.

Kivanc Mihcak, Kozintsev, Ramchandran, Spatially Adaptive Statistical Modeling of Wavelet Image Coefficients and Its Application to Denoising, Proceedings, IEEE International Conference on Acoustics, Speech, and Signal Processing, 1999, vol. 6.

Lukáš, Fridrich, and Goljan: Digital Camera Identification from Sensor Pattern Noise. IEEE Transactions on Information Security and Forensics, vol. 1(2), pp. 205-214, Jun. 2006.

Gassend, Lim, Clarke, van Dijk, Devadas: Identification and authentication of integrated circuits. Concurrency—Practice and Experience 16(11): 1077-1098 (2004).

Holcomb, Burleson, and Fu,: Power-Up SRAM State as an Identifying Fingerprint and Source of True Random Numbers. IEEE Trans. Comput. 58, 9 (Sep. 2009).

DeJean, Kirovski,: RF-DNA: Radio-Frequency Certificates of Authenticity. In: Paillier, P., Verbauwhede, I. (eds.) CHES 2007. LNCS, vol. 4727, pp. 346-363.Springer, Heidelberg (2007).

Clarkson, Weyrich, Finkelstein, Heninger, Halderman, Felten: Fingerprinting Blank Paper Using Commodity Scanners. In: Proceedings of S&P 2009, Oakland, CA, May 2009. IEEE Computer Society, Los Alamitos.

Lim, Lee, Gassend, Suh, van Dijk, Devadas,: Extracting Secret Keys From Integrated Circuits. IEEE Transactions on VLSI Systems 13(10), 1200-1205 (2005).

Bösch, Guajardo, Sadeghi, Shokrollahi, and Tuyls: Efficient Helper Data Key Extractor on FPGAs. CHES 2008, LNCS 5154, pp. 181-197, 2008.

Goljan, Fridrich, and Filler,: Large Scale Test of Sensor Fingerprint Camera Identification, Proc. SPIE, Electronic Imaging, Media Forensics and Security XI, San Jose, CA, Jan. 18-22, 2009, pp. 0I 1-0I 12.

Chen, Fridrich, Goljan, and Lukáš,: "Determining Image Origin and Integrity Using Sensor Noise," IEEE Transactions on Information Security and Forensics, vol. 3(1), pp. 74-90, Mar. 2008.

Fridrich,:"Digital Image Forensics Using Sensor Noise." IEEE Signal Processing Magazine, vol. 26, No. 2, Mar. 2009, pp. 26-37.

* cited by examiner

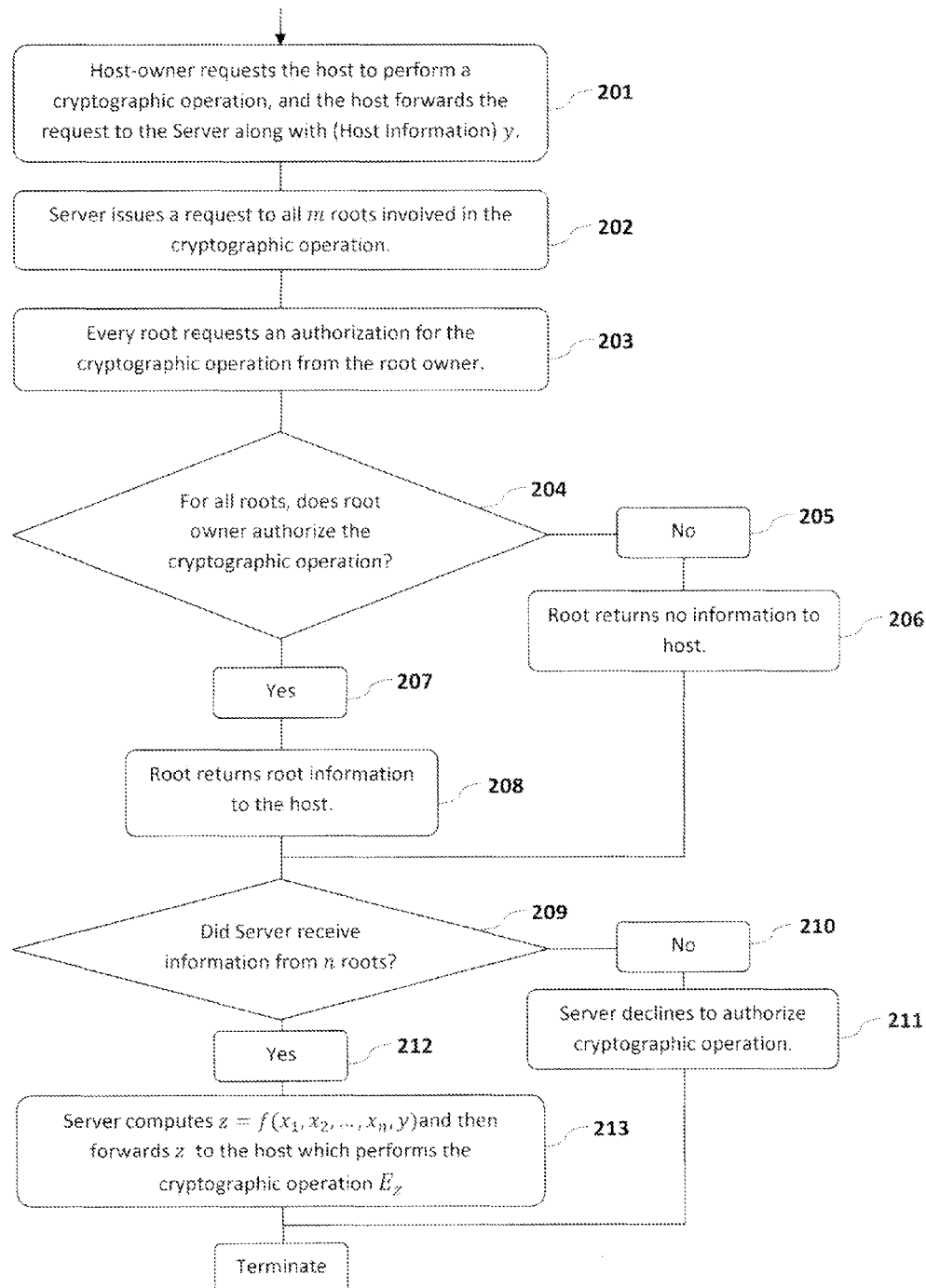

MOBILE PHONE AIDED OPERATIONS SYSTEM AND METHOD

REFERENCE TO RELATED APPLICATION

This application is related to U.S. patent application Ser. No. 12/838,021 entitled Computing-System Identifier Using Software Extraction of Manufacturing Variability, filed Jul. 16, 2010, herewith. That application is incorporated herein by reference.

FIELD

System and method for performing cryptographic operations, including authentication of valid users.

BACKGROUND

Many processes to be performed on digital systems require ways to authenticate valid participants in the processes, as well as ways to securely perform a cryptographic process itself. This need is rapidly increasing with more data being completely processed in the digital domain. In addition, there is a growing need to deal with the daily evolution of security threats and identity-theft attack techniques. Stand-alone systems for performing these processes, and the processes themselves, are often vulnerable to such threats and attacks.

One way of addressing the above concerns is to recognize that performance of aspects of such processes over multiple platforms, as opposed to a stand-alone, would offer a measure of protection against such threats and attacks. Conveniently, there are readily available digital devices which might be used for this purpose. In particular, cellular phones are becoming an integral part of our daily lives. Many people cannot imagine spending an hour without access to their cellular phones. With the recent growth in consumer adoption of cellular phones, it seems natural to utilize cellular phones to aid and to provide various user processes or applications.

The cellular phone provides a mobile computing platform which is relatively secure. The number of security attacks targeting cellular phones is significantly lower than similar attacks targeting personal computers (PC) due to their limited nature. As cellular phones become more capable, it is expected that attacks, which were traditionally used to compromise PCs, will migrate to cellular phones. Indeed, within the last year, the first email worms have emerged, which target high end cellular phones. Another trend is the fast paced adoption of multiple internet enabled devices, e.g. cellular phones, laptops, netbooks, etc., by individual users. It is expected that in as short as few years, an average individual will own several internet-enabled electronic devices. In the light of these two trends, we make the critical observation that, while individual devices are becoming more and more prone to attacks, it is much harder to compromise multiple devices simultaneously. This concept leads to an essential element in the subject system and method. Once aspects of a system are based on multiple platforms, it becomes harder to compromise the security of the system.

An example cryptographic tool which can benefit from the above observation is encryption. Encryption software has become essential for both end users and corporations who are concerned about protecting sensitive private data stored on storage devices. Again, in the context of a single user, the sensitive personal data is usually stored in the PC and is accessed by the user and other trusted individuals. However, when the PC is stolen or lost, the user may incur significant loss. Recent studies show that owners of laptops that have been stolen are more concerned about their private data rather than the loss of the equipment itself. The situation is even worse in the corporate setting where numerous users share sensitive corporate data on multiple devices. These concerns have led many software vendors to release file encryption tools. However, one may argue that the weakest aspect of file encryption tools (and other cryptographic operations) is key management.

The same as the above can be said about different cryptographic operations. For all of these reasons, it has become important to provide systems and methods for securely performing cryptographic operations.

SUMMARY

The present system uses multiple digital devices with possibly different users operating in concert, for performing authentication and other cryptographic operations. The multiple digital devices include, for example, a mobile device such as a cellular phone, as a central building block.

More particularly, the present system and method is directed to using information obtained from a mobile device, such as a cellular telephone (the "root" device), to enable a different entity running on a different device (the "host" device) to perform a cryptographic operation. The host device can be any electronic device which needs to perform a cryptographic operation, such as encrypting files, digitally signing documents, authenticating a host to a third party, and the like. Moreover, communication between the root and the host can go through a third party (such as a server) which can participate in the enabling of the cryptographic operation. As an example, a user may practice the inventive method to encrypt (cryptographic operation) files on a PC (the host) using a mobile phone (the root device).

The present system, which performs a cryptographic operation on a content signal, comprises m root devices, each root device being adapted for generating an associated root identity signal associated with each root device. Each root identity signal is representative of a substantially unique characteristic of its associated root device. The system further comprises a host device for generating a host signal associated with the host device, wherein the host device is possibly distinct from the m root devices. A third component of the inventive system is a key generator responsive to both the host signal and at least one of the m root identity signals. The key generator generates at least one cryptographic key signal in accordance with a key generation rule, from the received host signal and the m root identity signals. A cryptographic operation device, responsive to the key generator cryptographic key signal, performs a key-based cryptographic operation on the original content signal to generate a crypto content signal. The cryptographic operation may include encryption, generation of a digital signature, authentication of the host device to a third party, or any other applied cryptographic application. In an embodiment of this system, m is greater than or equal to 1.

In an embodiment of the present system, the host signal is representative of a unique characteristic of the host device. The system may further include an intermediate device adapted to selectively transfer at least one of the root identity signals to the key generator. In an embodiment, the root device is a mobile device, such as a cellular telephone, and the host device is a computer, such as a PC. In alternative embodiments, the key generator is part of the host device, and the cryptographic operation device is part of the host device.

Another innovation which contributes to the present system and method, is the usage of physical identifiers. While many devices are manufactured to be identical it has become clear that such a goal is impossible to achieve. Even when devices seem identical on a logical, operational or structural level, such devices present a level of difference in their physical structure. This is due to a phenomenon known as manufacturing variability. As described in the incorporated reference, U.S. patent application Ser. No. 12/838,021, as filed Jul. 16, 2010, herewith, manufacturing variability can be measured using a software-only approach. In accordance with the methods and systems of that incorporated reference, the present system and method derives a unique physical identifier for a device. That identifier is used as a root identity signal and, in some embodiments, the host signal, in the systems and methods described above, yielding a unique way to carry out cryptographic operations which simultaneously depend on the physical structure of several devices. As a consequence, cryptographic operations can be made unclonable and inherently unique to the set of devices used in carrying out these operations.

For example, the root identifier of the system is a fingerprint FP associated with a mobile device, such as a cellular phone. In one embodiment, the system includes a kit for generating an identifier for a computing system. The kit includes: (i) a computing system, having at least one component and including a processor and an operating system resident thereon; (2) a computer program embodied in a machine-readable medium, and adapted to be run by the operating system on the computing system. The program includes instructions which, when run by the operating system, generate a digital identifier value. The digital identifier value is substantially representative of a manufacturing variation of at least one component of the computing system relative to like-manufactured components. In an embodiment of the kit where the computing system includes a computer and an associated memory, the memory is the component for which the digital identifier is generated, and the digital identifier value is representative of manufacturing variation-based variations of a measured stored information retrieval time associated with the memory.

The computing system may be: (i) a computer, including at least one integrated circuit (wherein the integrated circuit is the component); (ii) a telephone, including at least one integrated circuit, (wherein the integrated circuit is the component); (iii) a camera, including at least one integrated circuit (wherein the integrated circuit is the component); (iv) a camera and an associated image sensor (wherein the image sensor is the component); (v) an audio device and an associated microphone, (wherein the microphone is the component); (vi) an audio device of a computer and an associated microphone, (wherein the microphone is the component); (vii) a computer and an associated display, (wherein the display is the component); (viii) a computer and an associated internal memory, (wherein the memory is the component); or (ix) a computer and an associated external flash memory, (wherein the flash memory is the component).

The kit may further include a coupler for selectively loading the computer program onto the computing system. In such an embodiment, the coupler is selectively operable to obtain the computer program by way of the internet, for loading onto the computing system.

In an embodiment, the program includes instructions which, when run by the operating system, perform further operations, such as processing the digital identifier value to generate redundancy information therefrom, or generating an identity string from the digital identifier value and the redundancy information, wherein the identity string is representative of the identity of the computing system. In an embodiment, the identity string is a privacy amplified version of a digital identity value. In alternate embodiments, the generation of the digital identifier value is pursuant to at least one: (i) noise reduction step; (ii) de-noising filtering step; or (iii) post-processing step. In an embodiment, the redundancy information is a result of an error checking and correction method. The generation of the identity string may be pursuant to at least one fuzzy extraction processing step.

The root identifier further includes computer program embodied in a machine-readable medium, and adapted to be run on a computing system, wherein the program includes instructions which, when run by the operating system, generate a digital identifier value. The digital identifier value is substantially representative of a manufacturing variation of at least one component of the computing system relative to like-manufactured components. In an embodiment, the program provides further instructions which, when run by the operating system, process the digital identifier value to generate redundancy information therefrom, and generate an identity string from the digital identifier value and the redundancy information. In such an embodiment, the identity string is representative of the identity of the computing system.

In one embodiment, the generation of the digital identifier value is pursuant to at least one: (i) noise reduction step; (ii) de-noising filtering step; or (iii) post-processing step. In an embodiment, the computer program generates the redundancy information pursuant to an error checking and correction method. The generation of the identity string is pursuant to at least one fuzzy extraction processing step, and may be a privacy-amplified version of digital identity value.

A method for a root identifier of the type that may be used with the present method, is one that is performed on a computing system in response to a computer program, and which includes the step of generating a digital identifier value associated with the computing system, which digital identifier value is substantially representative of a manufacturing variation of at least one component of the computing system relative to like-manufactured components.

That method includes the further steps of: (i) processing the digital identifier value to generate redundancy information therefrom; and (ii) generating an identity string from the digital identifier value and the redundancy information, wherein the identity string is representative of the identity of the computing system. In alternate embodiments, the step of generating the digital identifier value includes at least one: (a) noise reduction substep; (b) de-noising filtering substep; or (c) post-processing substep.

In an embodiment, the step of generating the redundancy information includes at least one error checking and correction substep. The step of generating the identity string includes at least one: (i) fuzzy extraction processing substep; or (ii) privacy amplifying substep.

In another embodiment of the inventive system, the root identity signal is an "on-demand" or "on-the-fly" signal. The inventive system may further include a receiver responsive to the host signal and at least one of the m root identity signals, for performing an inverse of the cryptographic operation on the crypto content signal, to re-generate the original content signal. In an alternative embodiment of this inventive system, the receiver is responsive to n of the m root identity signals to invert the cryptographic operation, wherein m is greater than 1 and n is greater than 1 and less than or equal to m.

In practicing the inventive method, information obtained by the host from the root device enables the host to complete the cryptographic operation. The host stores information, which is merged with information received from the root device, to generate merged information. The merged information is used to configure a cryptographic operation. One embodiment of the inventive method utilizes two binary strings x (which is stored at the root device) and y (which is stored at the host device). To encrypt a file, the root device (e.g., cellular phone) obtains x from the host device (e.g., PC) and then performs a merging operation between x and y to create the merged string z. An example of a very simple merging operation between x and y is the exclusive-OR of the two strings; i.e., $z=x \oplus y$. The new string z is used as the encryption key for the encryption operation.

In certain instances, the information provided by the root can be made essential to the completion of the cryptographic operation carried out by the host. This ensures that the host alone is not capable of carrying out the cryptographic operation. This concept can add a substantial level of security especially when the information retained by the root is only disclosed upon the permission of the owner of the root. The cryptographic operation would therefore not be completed until the owner of the root authorizes the operation.

A more advanced embodiment of the present system and method can use multiple roots corresponding to different owners. The host requires information from a number of the roots before the cryptographic operation can be carried out. The host collects the information from a subset of the available roots and merges all the information together with the host information and uses the merged information to carry out the cryptographic operation. Part of the work carried out by the host can be performed by the third party, such as producing the merged information. In that example, the host submits its request for merged information for a specific cryptographic task together with the host information y. Thus, implementing that embodiment, m owners may encrypt a document in a way that at least n of these owners must authorize access to the document before the document is actually accessed. Due to the mobile nature of the present method, once any entity attempts to access the target document, all owners are asked to authorize their cellular phones to provide their root information. Finally, the document can be accessed only when n (where n is less than m) of the owners have authorized their cellular phones to provide their root information. This process could also be carried out through a server which keeps track of the merged information and all participants of the encryption of the document. The PC where the decryption takes place can send the host information to the server, which collects the root information from each of the participating user cellular phones. If a sufficient number of the participants authorize the decryption, then the server can send the decryption key back to the PC where the document is decrypted and accessed.

In some forms of the present method, the inverse cryptographic operation depends on a key generation rule used by the key generator. In other forms, the inverse cryptographic operation depends on a key generation rule derived from the crypto content signal.

In some forms of the present method, the crypto content signal represents an encrypted file and the inverse cryptographic operation is to decrypt the file. In some forms, the key generation rule is any access policy for the encrypted file. In other forms, the key generation rule is stored and attached to the encrypted file. In some forms, the root device is a mobile phone. In other forms, the device is a hand held device.

In some forms, the cryptographic operation is encryption. In other forms, the cryptographic operation is a generation of a digital signature. In still other forms, the cryptographic operation is authentication of the host device to a third-party.

Thus, in accordance with the present system and method, by distributing the operations over several devices/platforms and requiring a human interaction, a user will no longer need to remember a password in order to access his encrypted information. Similarly, two users will no longer need to share a key in order to securely communicate. One user can simply encrypt the information, send it, and remotely authorize access to the information when the recipient attempts to access the information.

BRIEF DESCRIPTION OF THE FIGURES

FIG. 2 is a flowchart showing an embodiment of the present method.

DETAILED DESCRIPTION

As used in the present description, the following terms have the following working definitions. A "root" is essentially a mobile device, such as a cellular telephone, that is used by the system as a source of information needed to enable a cryptographic operation on the host. In alternative embodiments, more than a single root may participate in the cryptographic operation of the system. The "host" device performs the cryptographic operation. For completion of the cryptographic operation the host requires information from the root(s). The "server" is any third party that acts as an entity between the root(s) and the host. In certain embodiments, the server performs some mathematical operations on the information provided by the root(s) or the host. The "root(s) information" is information retained by the root(s). This is typically referred to using the symbol x and can be a simple binary identifier stored by the root(s). In a preferred embodiment, x represents a fingerprint of the root hardware where the information would be extracted directly from the root hardware rather than stored in memory. When there are several roots, the information for root i is referred to as $x_i$.

As used herein, "host information" is information retained by the host. This is typically referred to using the symbol y. The "merging function" is a mathematical operation used to combine the information from the root(s) and the host, and is referred to using the symbol $f$. The "combined information" is the output of the merging function, and is referred to using the symbol z. In fact, $z=f(x,y)$. When there are n roots, then $z=f(x_1, x_2, \ldots, x_n, y)$. The "cryptographic operation" is the operation that the host tries to perform using combined information z. This is referred to using designation $E_z()$. "Owner" of the root(s) refers to any entity that has control of the root device(s), whereas "Owner" of the host is any entity that has control of the host.

Figure 1A:
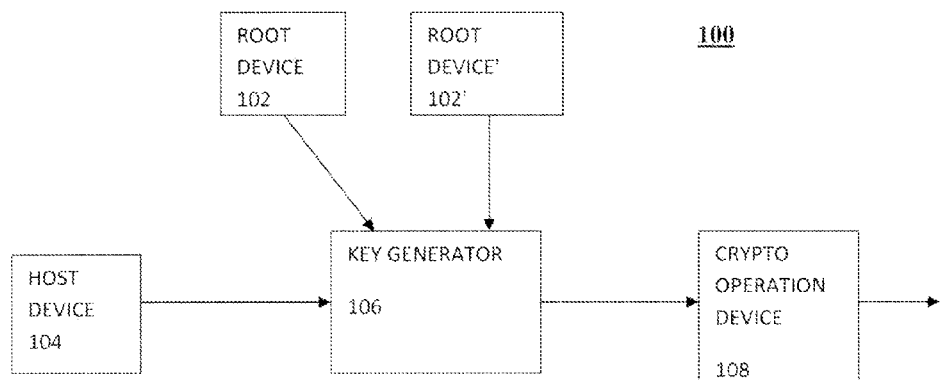
FIG. 1A is a schematic diagram showing an embodiment of the present system.

The present system 100 is shown generally in FIG. 1A. In that illustrated embodiment, the system includes at least one root device 102, 102'. The root device 102 preferably is a mobile telephone, or may be any other mobile device such as a personal digital assistant (PDA), personal information manager, portable media player, or other cellular, wireless, or network device capable of transmitting data from one location to another. Each root device 102, 102' may be owned by the same or different users, and each generates a substantially unique root identity signal. Upon request by the host device 104, this root identity signal is transmitted to a key generator 106, which collects the root identity signal from each n root devices.

The inventive system 100 further comprises a host device 104 capable of performing a cryptographic operation. The host device 104 may be any electronic device that stores information that requires cryptographic manipulation. The information subject to cryptographic operation may be stored in one or more memory devices resident in or in communication with the host device 104. The information may include files to be encrypted, documents subject to digital signature, files or information to be authenticated. The host device 104 may be a personal computer, or other electronic storage device, that generates a substantially unique host signal. The host signal necessarily must be distinct from the root identity signals generated by the n root devices 102, 102'. The host device 104 is associated with a host owner, which initiates a request to perform a cryptographic operation on predetermined content resident with the host device 104.

Figure 1B:
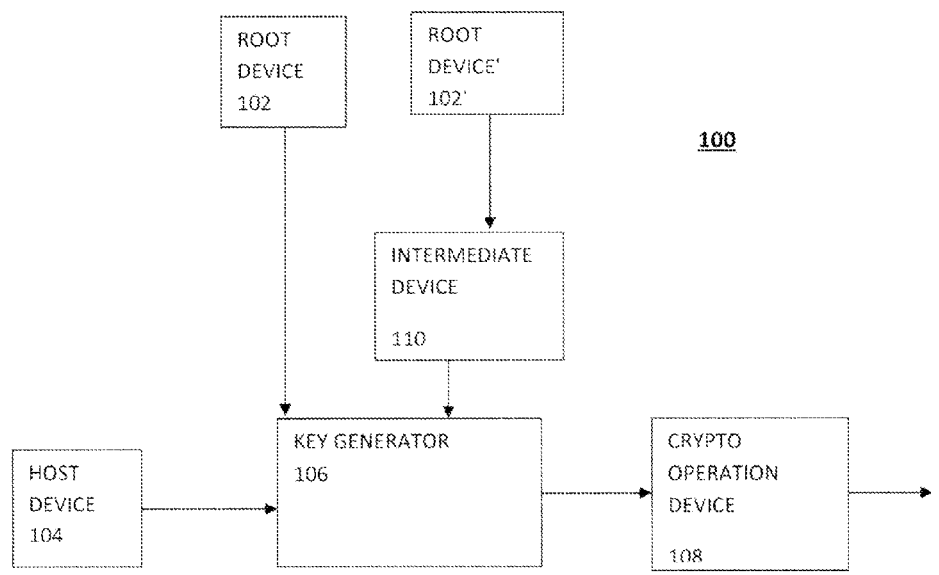
FIG. 1B is a schematic diagram showing an alternate embodiment of the present system.

The inventive system 100 includes a key generator 106, which is in electronic communication with the root devices 102 and the host device 104 to receive the root identity signal from one or more of the root devices 102, 102' and the host signal associated with the host device 104. The root device 102 may be in direct communication with the key generator 106, or in communication via an intermediate device 110, as shown in FIG. 1B. The intermediate device 110 may be a third party server, such as found on the internet, such as via a cloud computing service or other third party server service. In response to receipt of a root identity signal from a root device 102, together with a host signal from a host device 104, the key generator 106 generates at least one cryptographic key signal, described in further detail below. The cryptographic key signal is directed to and received by a crypto operation device 108, which performs a key-based cryptographic operation on the original content signal.

Figure 1C:
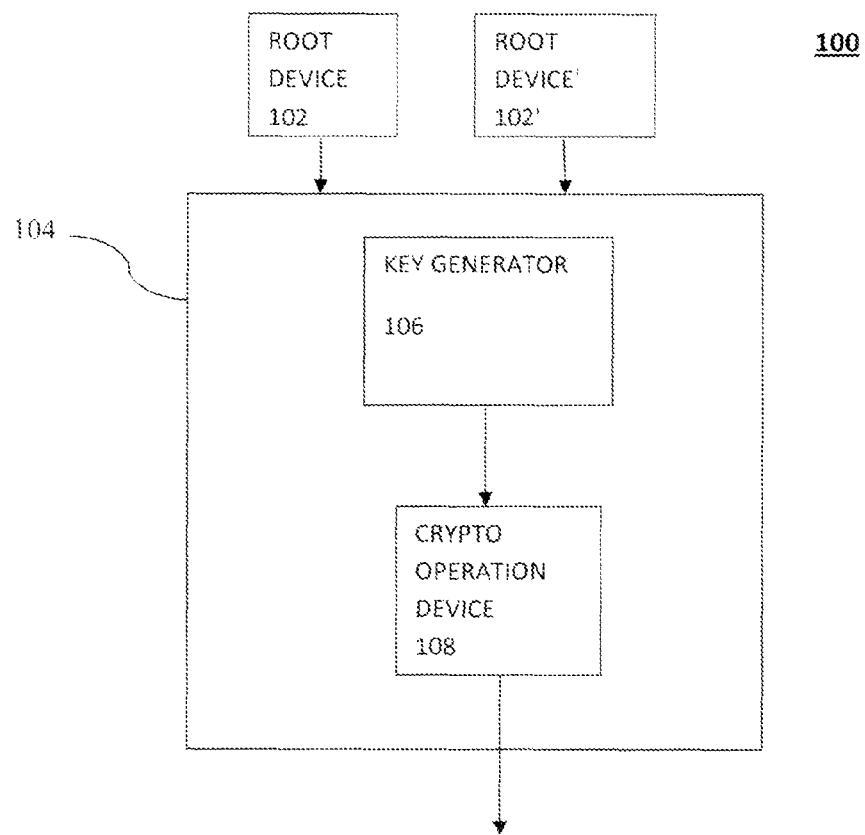
FIG. 1C is a schematic diagram showing yet another alternate embodiment of the present system.

As illustrated in FIG. 1C, in one embodiment of the inventive system, the key generator 106 and the crypto operation device 108 reside as devices in the host device 104. The key generator 106 mixes identifiers and information originating from different root devices in order to produce a key which obeys certain key generation rules. These rules can be predetermined for the generator or can be changed for different signals. Therefore, the key generation can manifest itself in different forms depending on the generation rules that govern the key extraction. As a simple example of a generation rule and a key generator, m initial signals can be used to generate a key where the generation rule is that only n<m signals are needed to regenerate the same key. In such a case the key generator can use a simple (n, m) secret sharing scheme to realize the generation rule. The crypto operation device represents the system which carrys out the crypto operation. If the crypto operation is to encrypt a file, then the device would be the processor which will encrypt the file.

The present method, as shown generally in FIG. 2, begins when the owner of a host initiates a cryptographic operation to be executed on the host 201. The host then forwards the request along with the host information to the server which services the owner's request by sending authorization requests to the m roots associated with the cryptographic operation 202, where m is greater than or equal to 1. When the roots receive the cryptographic operation request, each root requests 203 an authorization for the cryptographic operation from its owner 204. If the cryptographic operation is not authorized by the owner 205 of any root, the corresponding root does not send any information back to the server 206. On the other hand, when the owner of the root authorizes the cryptographic operation 207, the root then sends the root information ($x_i$ for root i) back to the server 208. The server checks whether more than nroots have returned root information 209, where n is less than or equal to m. If the number of roots responding with root information is less than n 210, then the server cannot perform the merging operation to produce the merged information z and declines to perform the cryptographic operation 211. If more than n roots provide their root information 212 then the server can compute the merged information $z=f(x_1, x_2, \ldots, x_n, y)$ and forwards z to the host. Finally, the host performs the cryptographic operation $E_z$ 213.

Figure 3:
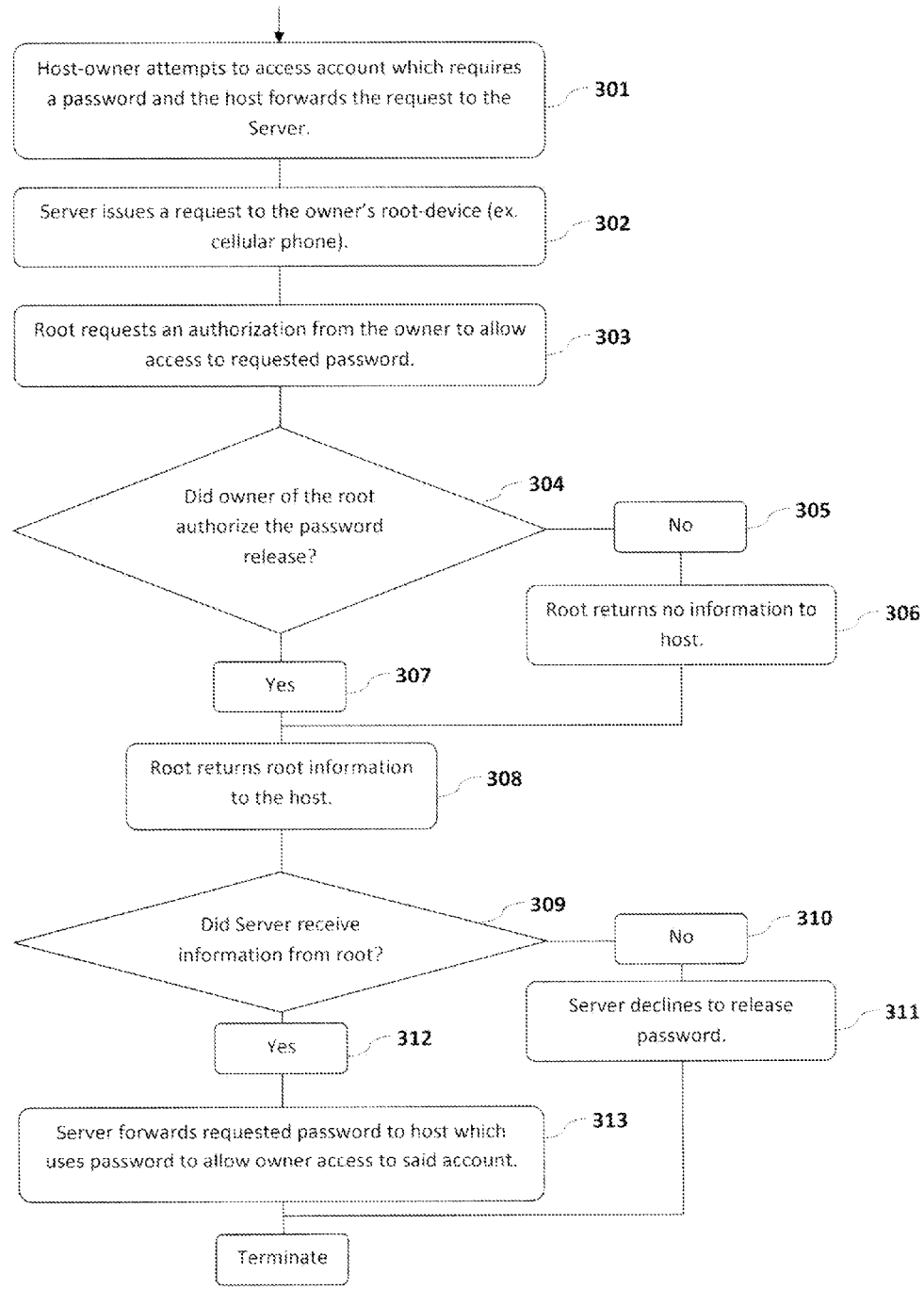
FIG. 3 is a flowchart showing the embodiment of the present method used as a password wallet.

An example of applying the present method to achieve a password wallet is shown in FIG. 3. The example begins when the owner of a host attempts to access a personal account or internet based information using the host 301. The host then forwards the request to the server which services the owner's request by sending authorization requests to the root associated with the owner of the host 302, this root can be the owner's cellular phone. When the root receives the password access request it requests 303 an authorization for the password access from its owner 304. If the password access is not authorized by the owner 305 the root does not send any information back to the server 306. On the other hand, when the owner of the root authorizes the cryptographic operation 307, the root then sends the root information back to the server 308. The server checks whether the root have returned root information 309. If the root responded with root information 310, then the server declines to requested password 311. If the root provides the root information 312 then the server can forward the requested password to the host. Finally, the host can allow access to personal of internet based account 313.

EXAMPLE 1

Encryption software is initially downloaded to both a PC and a cellular phone. Once the software is running on both platforms, it communicates with a designated server. The software running on each platform presents a number of identifiers used to uniquely determine the identity of the platform. For the cellular phone, these identifiers may include the phone serial number, the phone number, the international mobile equipment identity (IMEI), or any other relatively unique phone identifier. Even more specifically, some of these identifiers can be fingerprints of the target phone hardware reflecting the manufacturing variability which uniquely identifies each phone. These different phone identifiers can be labeled $Ix_1, Ix_2, \ldots, Ix_k$. Upon receiving these identifiers the server computes the hash of the phone identifiers along with a random string Rx generated by the server to produce an extra identifier for the phone. So, the server computes $Ix_{k+1}=H_K(Ix_1, Ix_2, \ldots, Ix_k, Rx)$ where $H_K$ is a cryptographic hash function configured with the secret key K which is stored by the server. The step will basically customize the cellular phone software and make it different from other copies of the same software. In addition, the server computes $Px_i=f(Ix_i)$ for $i=1 \ldots k+1$ where $f(\ )$ is an (l−1)-degree polynomial over a finite field with the zero intersection labeled S and $k+1<l\leq3(k+1)$. The server sends the computed points $Px_i$ to the cellular phone together with the new ID $Ix_{k+1}$ where both get stored in the cellular phone memory for future authentication. The PC can carry out a similar communication session with the server where the PC sends a number of identifiers, labeled $Iy_1, Iy_2, \ldots, Iy_k$. Next, the server repeats the process used with the cellular phone and computes $Iy_{k+1}=H_K(Iy_1, Iy_2, \ldots, Iy_k, Ry)$ together with $Py_i=f(Iy_i)$ for $i=1 \ldots k+1$ where Ry is a random string generated and stored by the server. The PC stores the computed points $Px_i$ together with the new ID $Ix_{k+1}$. As a final step of this enrollment process, the server generates a number of random strings labeled $Iz_1, Iz_2, \ldots, Iz_{k+1}$ and computes $Pz_i = f(Iz_i)$ for $i=1 \ldots k+1$ all of which are kept in the same data base entry as the $Px_i$, $Px_i$, Rx, $Iy_i$, $Py_i$, Ry strings. Now using l-pairs of the form $(I, f(I))$ constant coefficient of the polynomial $f$, i.e. $S = f(0)$, can be computed using interpolation. Because $k+1 < l$ neither the PC nor the cellular phone can independently compute S. Therefore, whenever S needs to be computed the PC and the cellular phone must collaborate. This process of hiding S is basically the classical scheme for secret sharing and can therefore be substituted with any other secret sharing scheme generally known and used by those skilled in the relevant art.

In order to encrypt a file F the PC software computes $H_{K_y}(F)$ and sends it to the server, together with $(Iy_1, Py_1), \ldots, (Iy_{k+1}, Py_{k+1})$ where H is a hash function and $K_y$ is a key stored by the PC. Upon receiving this information the server sends a request to the cellular phone to authorize the encryption operation. The cellular phone prompts the user to authorize the encryption of the file F. If the user of the phone authorizes the operation then the cellular phone software sends back to the server $(Ix_1, Px_1), \ldots, (Ix_{k+1}, Px_{k+1})$. The server can use interpolation to compute the polynomial $f$ and retrieve the secret key S. Afterwards, the server computes the encryption key $K_E = H_K(S, H(F))$ and sends it back to the PC. Finally, the PC uses the encryption key $K_E$ to encrypt the file F before completely discarding the key $K_E$. The PC then stores the encrypted version of the file together with the hash of the file for future use. When the user desires to access an encrypted file, the communication scenario used for encryption can be repeated to retrieve the encryption key which can be used to decrypt the file.

In this example use scenario, the PC does not retain the encryption key, only the encrypted file, the hash of the file, the hash key, and a number of identifiers for the PC. Many features can be slightly modified to achieve higher levels of convenience for the end user. One such modification is to give the user the option to allow an authorization for a specific period of time. This would allow many encryption/decryption operations to take place within a pre-set time duration without requiring the user to authorize every operation. Another, modification would be to allow a direct communication between the PC and the cellular phone without going through the server. In such a case, the server tasks can be given to either the PC or the cellular phone. All variations provide the same essential service and implement the present system and method.

EXAMPLE 2

Authentication and Password Wallets

Another example use scenario that embodies the present system and method is authentication. Building on a similar protocol as described above in the Example 1 encryption usage scenario, the present system and method includes retaining passwords and providing authentication. Current password wallets retain the passwords on a user's PC. Although this is convenient, it is not secure. Any user of the PC can utilize the same passwords and therefore impersonate the original owner of the passwords. As a solution to this problem, a password wallet can retain all PC passwords in an encrypted format in a way similar to the file encryption implementation outlined above. Using the present system and method, a user would be required to authorize the usage of passwords through the user cellular phone before each password can be used. Any other user of the PC would not be able to use the passwords unless they also had possession of the cellular phone.

To establish a more secure and convenient embodiment of the present system to achieve authentication, a password wallet can be retained encrypted on the user or other target cellular phone. In this embodiment, the PC does not even have the passwords except at the time of use. Moreover, this allows a user to use the passwords in an auto-fill fashion on any trusted computer.

The various methods described above may be embodied in, and fully automated by, software code modules executed by one or more general purpose computers. The code modules may be stored in any type of computer storage device or devices (hard disk storage, solid state RAM, and the like). The steps may be implemented using any type of computer storage device or devices, and using any type or types of data repositories (relational databases, flat files, caches, and the like) to store any data.

As will be appreciated, various combinations of the features and methods described herein may be incorporated into a given system according to the present system. Accordingly, all combinations of the disclosed features and methods fall within the scope of this disclosure.

Although this system and method has been described in terms of certain embodiments, other embodiments that are apparent to those of ordinary skill in the art, including embodiments which do not provide all of the benefits and features set forth herein, are also within the scope of this invention. Accordingly, the scope of the present system and method is defined only by reference to the appended claims.

What we claim is:

1. A system for performing a cryptographic operation on a content signal, comprising:
    A. m root devices, wherein a root device is a mobile phone, each root device generating an associated root identity signal, each root identity signal being representative of a substantially unique characteristic of its associated root device, wherein the root identity signal is digital fingerprint of a substantially unique manufacturing variability characteristic of the associated root device, wherein the step of generating the root identity signal includes at least one of: (i) a noise reduction step or (ii) a de-noising filtering step,
    B. a host device for generating a host signal associated with the host device, wherein the host device is distinct from the m root devices,
    C. a key generator responsive to the host signal, wherein the key generator is part of the host device, and a plurality of root identity signals, for generating at least one cryptographic key signal based at least in part on a key generation rule, the host signal and the plurality of root identity signals, and
    D. a cryptographic operation device responsive to the cryptographic key signal, for performing a key-based cryptographic operation on the content signal, to generate a crypto content signal, the crypto content signal requiring at least two root identity signals from the m root devices for duplicating or reversing the key-based cryptographic operation.

2. A system according to claim 1 wherein the host signal is representative of a unique manufacturing variability characteristic of the host device.

3. A system according to claim 1 wherein m=2.

4. A system according to claim 1 wherein m is greater than 1.

5. A system according to claim 4 wherein the cryptographic operation device is part of the host device.

6. A system according to claim 1 further comprising an intermediate device adapted to selectively transfer at least one of the root identity signals to the key generator.

7. A system according to claim 1 wherein the host signal is digital fingerprint of a substantially unique manufacturing variability characteristic of the host device.

8. A system according to claim 1 wherein the root identity signal is an on-the-fly-generated signal.

9. A system according to claim 1 further including a receiver responsive to the host signal and at least two of m root identity signals, for performing an inverse of the cryptographic operation on the crypto content signal, to re-generate the content signal.

10. A system according to claim 9 wherein m=2.

11. A system according to claim 9 wherein the receiver is responsive to the m root identity signals for performing an inverse of the cryptographic operation on the crypto content signal, wherein m is greater than 1.

12. A system according to claim 9 wherein the receiver is responsive to n of the m root identity signals for performing an inverse of the cryptographic operation on the crypto content signal, wherein m is greater than 1, and n is greater than 1 and less than m.

13. A system according to claim 9 wherein the inverse cryptographic operation depends on a key generation rule derived from the crypto content signal.

14. A system according to claim 9 wherein the crypto content signal represents an encrypted file and the inverse cryptographic operation is to decrypt the file.

15. A system according to claim 14 wherein the key generation rule is stored and attached to the encrypted file.

16. A system according to claim 14 wherein the key generation rule is an access policy for the encrypted file.

17. A system according to claim 1 wherein a root device is a hand held device.

18. A system according to claim 1 wherein the cryptographic operation is encryption.

19. A system according to claim 1 wherein the cryptographic operation is a generation of a digital signature.

20. A system according to claim 1 wherein the cryptographic operation is a retrieval of a password.

21. A system according to claim 1 wherein the cryptographic operation is an authentication of the host device to a third-party.

22. A method for performing a cryptographic operation on encrypted content, comprising:
  requesting, by a hardware processor, authorization to decrypt the encrypted content from a first set of root devices from a superset of m root devices, wherein a root device is a mobile phone;
  receiving a set of root identities associated with a subset of root devices from the first set root devices, each root identity being representative of a substantially unique characteristic of its associated root device, wherein the root identity is digital fingerprint of a substantially unique manufacturing variability characteristic of the associated root device, wherein the step of generating the root identity includes at least one of: (i) a noise reduction step or (ii) a de-noising filtering step;
  receiving a host identity associated with a host device, wherein the host device is distinct from the m root devices;
  generating a cryptographic key, wherein the key generator is part of the host device, based at least in part on the host identity, the set of root identities from the subset of root devices and a key generation rule;
  and performing a key-based decryption operation on the encrypted content to generate content, the decryption operation requiring at least two root identities from the m root devices for successfully decrypting the encrypted content.

* * * * *